US006777907B2

United States Patent
Ho

(10) Patent No.: US 6,777,907 B2
(45) Date of Patent: Aug. 17, 2004

(54) CURRENT RIPPLE REDUCTION BY HARMONIC CURRENT REGULATION

(75) Inventor: Eddy Ying Yin Ho, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/285,186

(22) Filed: Oct. 31, 2002

(65) Prior Publication Data

US 2003/0090232 A1 May 15, 2003

Related U.S. Application Data

(60) Provisional application No. 60/330,980, filed on Nov. 6, 2001.

(51) Int. Cl.[7] .............................. H02P 5/34; H02P 7/42
(52) U.S. Cl. ........................ 318/801; 318/798; 318/800; 318/803; 318/813; 318/727; 318/432; 318/434; 318/767
(58) Field of Search ................................. 318/767, 798, 318/799, 800, 801, 802, 727, 803, 813, 432, 434

(56) References Cited

U.S. PATENT DOCUMENTS

| | | | | |
|---|---|---|---|---|
| 4,469,997 A | * | 9/1984 | Curtiss et al. ............... | 318/729 |
| 4,680,526 A | * | 7/1987 | Okuyama et al. ............ | 318/802 |
| 5,047,909 A | * | 9/1991 | Hosoda ........................ | 363/40 |
| 5,321,599 A | * | 6/1994 | Tanamachi et al. .......... | 363/41 |
| 5,473,240 A | * | 12/1995 | Moreira ....................... | 318/801 |
| 5,585,709 A | * | 12/1996 | Jansen et al. ................ | 318/807 |
| 6,069,467 A | | 5/2000 | Jansen | |
| 6,614,202 B2 | * | 9/2003 | Edelson ....................... | 318/727 |
| 6,683,428 B2 | * | 1/2004 | Pavlov et al. ............... | 318/432 |

OTHER PUBLICATIONS

A.M. Walczyna, "Novel PWM Strategy for Direct Self–Control of Inverter Fed Induction Motors", Railway Research Institute, Sep. 1993, pp. 610–615.*
C. Broche et al, "Harmonic Reduction in DC link Current of a PWM Induction Motor Drive by Active Filtering", IEEE, Oct. 20, 2002, pp. 633–.*
"Bldc Motor Control in Multiple dq AXES" Power Electronics and Variable Speed Drives, Sep. 18–19, 2000, Conference Publication No. 475 IEE 2000.

* cited by examiner

Primary Examiner—David Martin
Assistant Examiner—Tyrone Smith
(74) Attorney, Agent, or Firm—Ostrolenk, Faber, Gerb & Soffen, LLP

(57) ABSTRACT

A method and apparatus for regulating a harmonic current component of an inverter fed motor drive system comprises measuring a phase current of the motor, substantially eliminating the fundamental component of the phase current, demodulating the phase current having the fundamental component substantially eliminated to produce a first current signal and providing the first current signal to a PWM control input of an inverter drive of the inverter fed motor drive system to affect the inverter output voltage by driving a first harmonic current of the motor substantially to zero thereby to achieve harmonic current control. More accurate, estimated motor voltages can also be provided by the system.

24 Claims, 3 Drawing Sheets

US 6,777,907 B2

CURRENT RIPPLE REDUCTION BY HARMONIC CURRENT REGULATION

CROSS REFERENCE TO RELATED APPLICATION

This application claims the benefit and priority of U.S. Provisional Application No. 60/330,980 filed Nov. 6, 2001 and entitled CURRENT RIPPLE REDUCTION BY HARMONIC CURRENT REGULATION, the disclosure of which is incorporated herein by reference.

BACKGROUND OF THE INVENTION

1. Field of the Invention

The present invention relates to a method of suppressing current ripple in an inverter fed motor drive system.

2. Description of the Related Art

High performance inverter fed AC motor drives require smooth torque control. The motor torque generated by an inverter fed AC drive contains various harmonic torque components.

These harmonic torque components are consequences of inverter-induced harmonics and motor-induced harmonics. Examples of inverter-induced harmonics include inverter dead-time, sensor offset, PWM chopping, etc. Examples of motor-induced harmonics include winding slots and symmetry, etc. The $n^{th}$ harmonic torque component mainly is generated by the $(n+1)^{th}$ and $(n-1)^{th}$ harmonic currents interacting with the fundamental flux of the motor.

The low frequency torque ripples are considered the most crucial because they can transmit to the drive load, causing speed fluctuation, and in some cases damaging the drive load. The $6^{th}$ harmonic torques, due to inverter blanking time (dead time), are of particular concern.

The consequence of inverter dead-time is torque ripple. Most of the prior art schemes address the problem by compensation of inverter voltage error. Due to the complex, non-linear behavior of the dead-time effect, however, a complete compensation of the dead-time effect may not be achieved. Moreover, the prior art schemes do not focus directly on torque ripples.

It would be beneficial to provide a direct approach to harmonic torque elimination that addresses not only the torque harmonic problem caused by inverter dead time, but also problems caused by various other imperfections, such as motor space harmonics, which lead to the generation of harmonic torques. Further, it would be beneficial to provide a method of suppressing the $n^{th}$ harmonic torque by eliminating the $(n+1)^{th}$ and $(n-1)^{th}$ harmonic currents.

Furthermore, it would also be useful to be able to derive more accurate estimated motor voltages from the controller command voltages, particularly to provide better lower operating speed encoderless low cost drivers.

SUMMARY OF THE INVENTION

A method and apparatus are provided for suppressing current ripple in an inverter fed motor drive system. The method and apparatus can be used to eliminate harmonic torque currents in AC motor drive systems.

In accordance with the invention, a method is provided for regulating a harmonic current component of an inverter fed motor drive system comprising, measuring a phase current of the motor, substantially eliminating the fundamental component of the phase current, demodulating the phase current having the fundamental component substantially eliminated to produce a first current signal; and providing the first current signal to a PWM control input of an inverter drive of the inverter fed motor drive system to affect the inverter output voltage by driving a first harmonic current of the motor substantially to zero thereby to achieve harmonic current control.

Further, in accordance with the invention, apparatus is provided for regulating a harmonic current component of an inverter fed motor drive system comprising a sensor measuring a phase current of the motor, a circuit substantially eliminating the fundamental component of the phase current, a demodulator to demodulate the phase current having the fundamental component substantially eliminated to produce a first current signal and a circuit for injecting the first current signal to a PWM control input of an inverter drive of the inverter fed motor drive system to affect the inverter output voltage by driving a first harmonic current of the motor substantially to zero thereby to achieve harmonic current control.

In more detail, the harmonic torque is suppressed by a new control method that eliminates harmonic currents which contribute to the undesirable torque harmonics. The method includes measuring the motor phase currents, and removing the fundamental current component by current command. The remaining harmonic currents, which contribute to the torque ripple of concern, are discriminated by demodulation and controlled to zero by way of current regulation. For example, to eliminate the $6^{th}$ harmonic torque, the $(n+1)^{th}$ and $(N-1)^{th}$ harmonic currents are reduced by the current regulation technique of the invention.

Outputs can be provided from the motor drive to provide more accurate estimates of motor voltage, as a result of the ripple reduction, without requiring expensive encoders.

Other features and advantages of the present invention will become apparent from the following description of the invention which refers to the accompanying drawings.

DETAILED DESCRIPTION OF THE PREFERRED EMBODIMENTS

Figure 1:
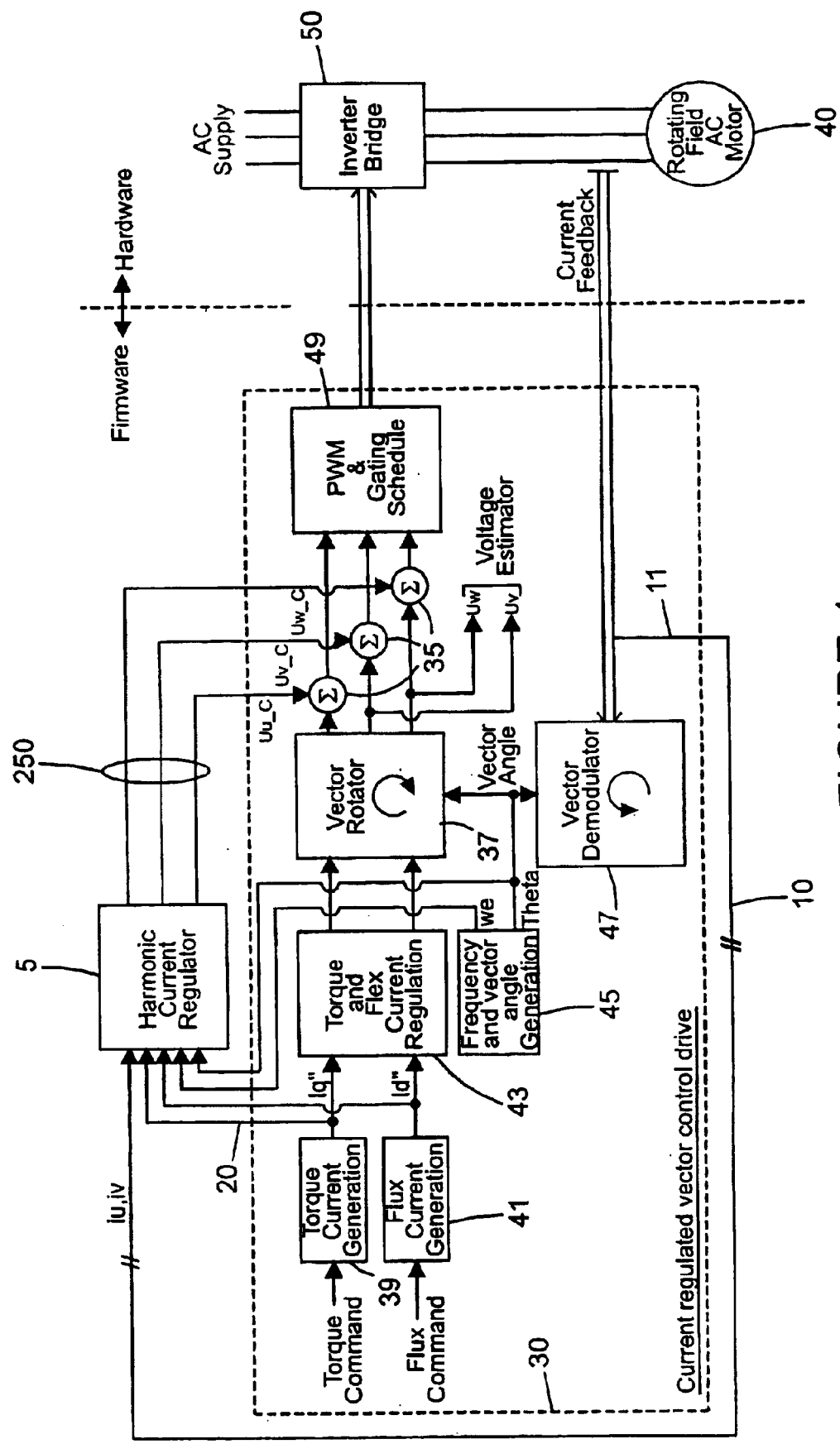
FIG. 1 is a functional block diagram showing the integration of the method and apparatus of the present invention into a harmonic current regulator in an inverter fed motor drive system.

Referring to FIG. 1, the present invention provides a motor control technique that is preferably implemented in firmware using e.g., a DSP (digital signal processor) or an FPGA type device. The method can be integrated into any current regulated vector control drive, shown generally at 30, operating a rotating field machine, e.g., an AC motor 40, via a PWM inverter bridge 50. The control drive 30 is modified in accordance with the invention. The invention resides in coupling a harmonic current regulator 5 to the vector control drive, operated as described herein. The vector control drive 30 is modified by providing inputs iq*, id*, ωe, Theta and phase currents un, iv to the harmonic current regulator 5. Outputs 250 of the harmonic current regulator 5 are provided to respective summing stages 35 provided in output lines from conventional vector rotator 37. Control elements 37, 39, 41, 43, 45, 47 and 49 of vector control drive 30 are conventional.

The following definitions are utilized throughout:

| Term | Definition |
| --- | --- |
| Del_Comp | feed back delay compensation |
| id* | flux current command |
| iq* | torque current command |
| iu | phase current |
| iu_H | phase current (fundamental removed) |
| iv | phase current (120 Deg lagging iu) |
| iv_H | harmonic phase current (fundamental removed) |
| N | harmonic number |
| Theta | field angle for vector drive (integration of We) |
| Theta_N | harmonic field angle for vector demodulation |
| Uu_C | harmonic current regulator output (u phase) |
| Uv_C | harmonic current regulator output (v phase) |
| Uw_C | harmonic current regulator output (w phase) |
| ωe | Inverter fundamental frequency |

Although the invention is applicable to the reduction of any harmonic torque, i.e., the $n^{th}$ harmonic torque, it will be described herein in detail with relation to reducing the $6^{th}$ harmonic torque.

Figure 2:
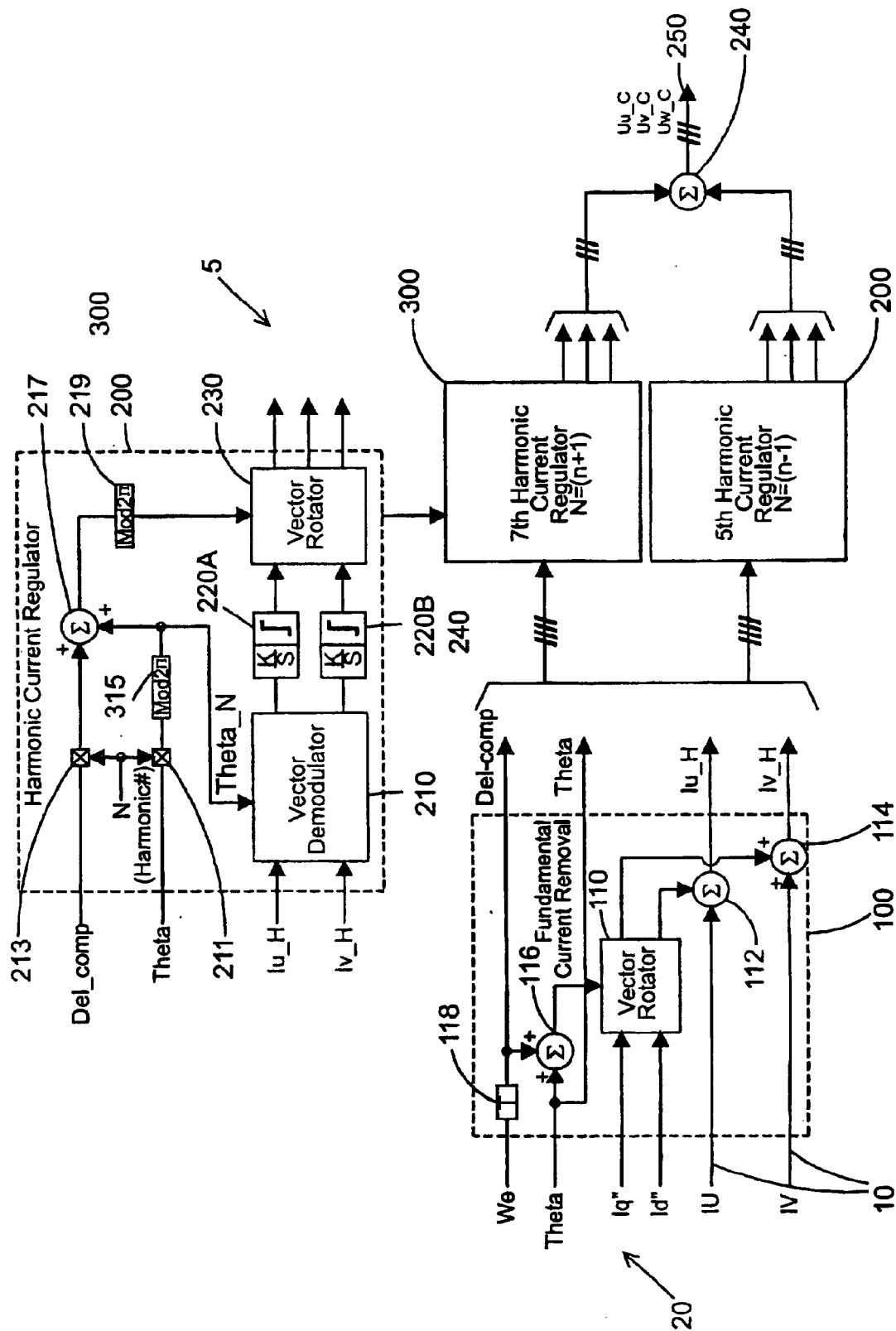
FIG. 2 is a functional block diagram showing the method and apparatus for harmonic current regulation according to the present invention, and in particular, applied to the $6_{th}$ harmonic torque.

According to a preferred embodiment of the present invention, the method for harmonic torque (e.g. $6^{th}$ harmonic) reduction caused by inverter dead-time involves extraction of the $n-1^{th}$ (5th) and $n+1^{th}$ (7th) harmonic current components from the feedback current and regulating these currents to zero. FIG. 2 shows the method of harmonic current regulation. FIG. 2 shows the harmonic current regulator 5 of FIG. 1 in greater detail. The harmonic current regulator comprises a fundamental component removing stage 100. This stage comprises a vector rotator 10 that receives the commands id* and iq*. The outputs of the vector rotator 110 are supplied to respective summing stages 112 and 113 which each generate a difference signal with the respective phase currents iu and iv, thereby generating the current signals iu_H and iv_H, each with the fundamental removed. The signals ωe and Theta are also provided as shown. A delay compensation signal Del_Comp is provided by delay stage 118. The signal Del_Comp is subtracted from Theta in stage 116 and applied to the vector rotator 110.

The phase currents (iu and iv) shown at 10 are measured by an appropriate current sensor at 11 and the, fundamental component is removed by stage 100 from the torque and current command signals (iq* and id*) shown at 20. The torque and current command signals iq* and id* are well known and are readily available as shown at 20 in conventional current regulated vector drives, shown generally by reference numeral 30 in FIG. 1. The harmonic currents can be extracted without the removal of the fundamental component. However, removal of the fundamental component allows extended harmonic current regulator bandwidth. The phase current in with the fundamental removed is shown at iu_H. The phase current iv 120° lagging iu with the fundamental removed is shown at iv_H.

The currents (iu_H, iv_H) contain harmonics only. The fundamental component has been removed. Then the $n^{th}$ harmonic component can be extracted by using a vector demodulator. In particular, since the $n^{th}$ harmonic torque is mainly generated by the $(n+1)^{th}$ and $(n-1)^{th}$ harmonic currents interacting with the fundamental motor flux, eliminating these two harmonic currents will substantially eliminate the $n^{th}$ harmonic torque. As discussed, the $6^{th}$ harmonic torque component is particularly troublesome. To reduce it, the $5^{th}$ and $7^{th}$ harmonics currents are regulated, as shown in FIG. 2. Accordingly, the harmonic current regulator 5 will include a $5^{th}$ harmonic current regulator 200 and a $7^{th}$ harmonic current regulator 300. Each regulator 200, 300 has the block diagram shown in the upper portion of FIG. 2 and includes a vector demodulator 210. The vector demodulator 210 receives the harmonic vector angle (Theta_N) for demodulation, which is generated from the fundamental field angle (Theta) as shown in FIG. 2. The field angle Theta is multiplied in a multiplier 211 by the number N of the harmonic to be reduced. In this case N=n−1. Where n=6, N=5. The signal Del_Comp is multiplied in a multiplier 213 by N. The signal from multiplier 211 is delayed by Mod $2\pi$ (215) to produce Theta_N. Theta_N and Del_Comp are summed at 217 and the output delayed by Mod $2\pi$ at 219. Using the $N_{th}$ harmonic vector angle Theta_N for the demodulation, the $N_{th}$ harmonic current of current signals iu_H and iv_H will be translated to DC at the output of the vector demodulator 210, while all other harmonics will appear as AC signals. Therefore, an integrating action by integrators 220A, 220B is used to force, by regulation, the DC component (translated $N^{th}$ harmonic current component) to zero. The outputs of the integrators 220A and 220B are provided to a vector rotator 230. The outputs of the two harmonic current regulators 200 $(n-1)^{th}$, 300 $(n+1)^{th}$ are summed at 240 and the outputs 250 provided to the vector drive to be summed with the respective PWM control signals by summing stages 35. The outputs 250 are provided to cancel the harmonic currents at the inputs to the PWM stage 49, eventually forcing the harmonic currents, and thus the affected torque harmonic, to zero.

For the harmonic current regulator 300, N=n+1. Where n=6, N=7. The operation of regulator 300 is the same as regulator 200.

The outputs of different harmonic current regulators are combined by superposition to form three outputs (Uu_C, Uv_C, Uw_C). These are injected to the corresponding phase modulation inputs (as shown in FIG. 1) to affect the inverter output voltage for harmonic current control.

The superposition of the outputs of the two current regulators 200 and 300 regulating the $5^{th}$ and $7^{th}$ harmonic currents, results in signals that can be injected into the control drive via the stages 35 to reduce the $6^{th}$ harmonic torque. In the general case, the regulation of the $(n-1)^{th}$ and $(n+1)^{th}$ harmonic currents results in reduction in the $n^{th}$ harmonic torque.

Likewise, any other harmonic current components of concern can be extracted and regulated to zero by using identical structures in parallel as shown in FIG. 2. For example, the second and fourth harmonic currents can be regulated, thus reducing the third harmonic torque.

Figure 3:
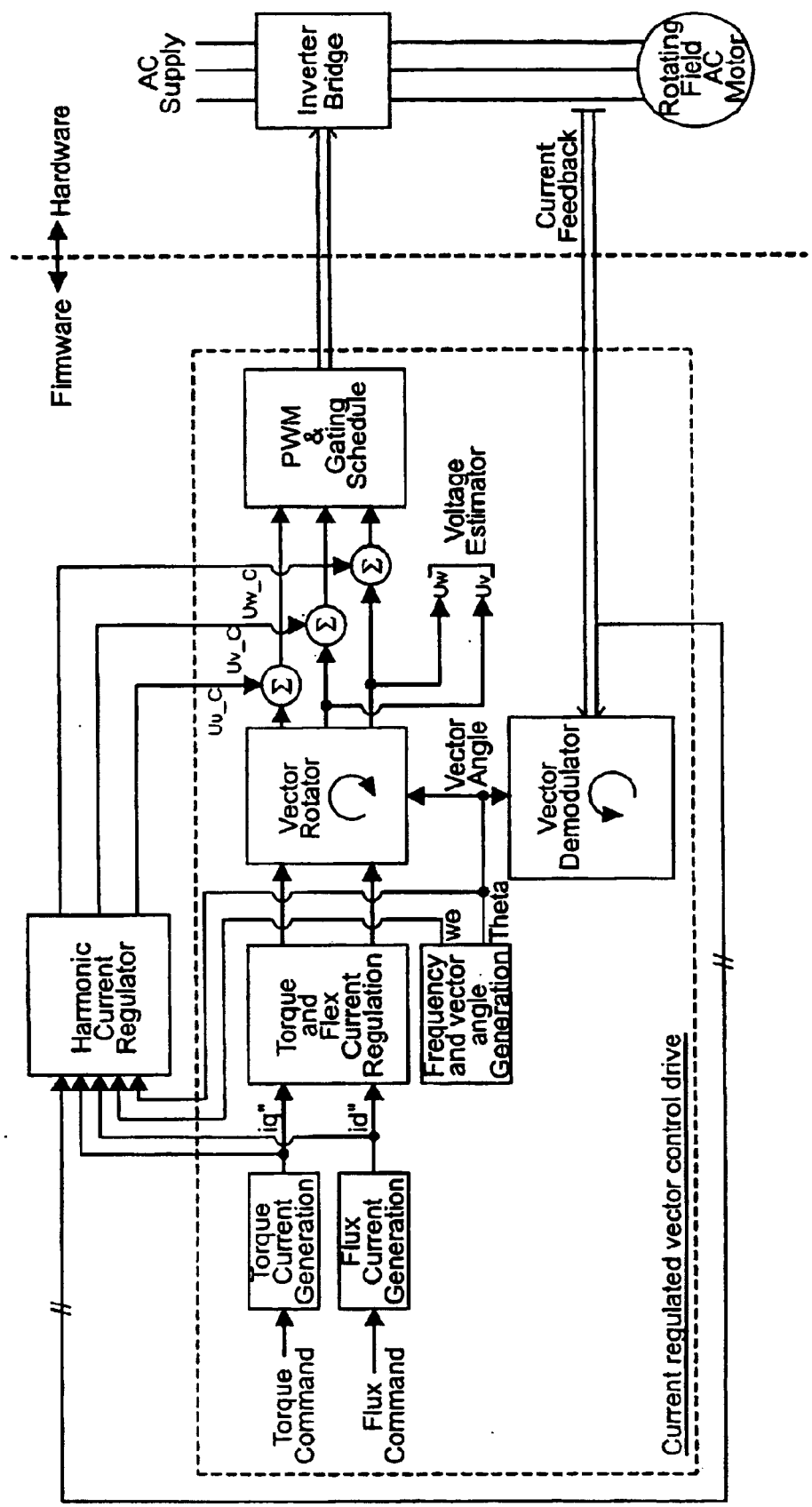
FIG. 3 is the functional block diagram shown in FIG. 1 showing how voltage estimation is accomplished.

Another aspect of the invention is shown in FIG. 3. Most encoderless (without shaft encoder) drive controllers require voltage feedback for back EMF control schemes. In cases where low speed (<15%) operation is applied, accurate voltage information is required. However, it is in general not practical to sense motor voltages due to acquisition of high bandwidth PWM voltage signals and increased hardware cost. In most cases, the motor voltages are estimated using controller command voltages. The accuracy of using command voltages is affected by inverter nonlinearities such as dead time, device voltage drop etc. Using the harmonic current regulator of the invention to eliminate toque ripple by compensating the nonlinear effects introduced by the inverter, it is also possible to achieve a more accurate voltage estimation. As shown in the attached FIG. 3, Uv and Uw are sensed before the harmonic current regulation. Therefore these voltages better approximate motor voltages (inverter nonlinearities have been compensated) and can be used to provide better (lower operating speed) encoderless drives. FIG. 3 is identical to FIG. 1 except it shows where to tap off the estimated motor voltages.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A method for regulating a harmonic current component of an inverter fed moor drive system comprising:
   measuring a phase current of the motor;
   substantially eliminating the fundamental component of the phase current;
   demodulating the phase current having the fundamental component substantially eliminated to produce a first current signal; and
   providing the first current signal to a PWM control input of an inverter drive of the inverter fed motor drive system to affect the inverter output voltage by driving a first harmonic current of the motor substantially to zero thereby to achieve harmonic current control.

2. The method of claim 1, wherein the step of measuring a phase current of the motor comprises measuring at least two phase currents of the motor;
   the step of substantially eliminating the fundamental component of the phase current comprises substantially eliminating the fundamental component in each of the measured phase currents of the motor;
   the step of demodulating comprises demodulating each of the phase currents having the fundamental component substantially eliminated to produce a first set of current signals; and
   the step of providing comprises providing each of the first set of current signals to the PWM control input to drive the first harmonic current of the motor substantially to zero.

3. The method of claim 2, further comprising the step of demodulating each of the phase currents the fundamental component substantially eliminated to produce a second set of current signals;
   summing respective ones of the first and second sets of signals to form a third set of signals; and
   providing the third set of signals to the PWM control input to drive the first harmonic current and a second harmonic current of the motor substantially to zero.

4. The method of claim 3, further wherein the step of providing comprises summing respective ones of the third set of signals with control inputs to the PWM control input provided from the inverter fed motor drive system.

5. The method of claim 4, wherein the first and second harmonic currents comprise the $(n-1)^{th}$ harmonic current and the $(n+1)^{th}$ harmonic current resulting in substantial elimination of the $n^{th}$ harmonic torque in the inverter fed motor drive system, wherein n denotes the $n^{th}$ harmonic, $(n-1)^{th}$ denotes the harmonic current one below the $n^{th}$ and $(n+1)^{th}$ denotes the harmonic current one above the $n^{th}$.

6. The method of claim 3, wherein the steps of demodulating each of the phase currents having the fundamental component substantially eliminated to produce a first and second set of current signals further comprises providing vector demodulated signals, integrating said vector demodulated signals to regulate the first and second desired harmonic currents of the motor to substantially zero and applying the integrated signals to a vector rotator prior to providing the first and second sets of signals to the PWM control.

7. The method of claim 1, further comprising providing an estimated motor voltage from the inverter drive.

8. The method of claim 4, further comprising producing a plurality of estimated motor voltages derived from the control inputs to the PWM control input.

9. Apparatus for regulating a harmonic current component of an inverter fed motor drive system comprising:
   a sensor measuring a phase current of the motor;
   a stage substantially eliminating the fundamental component of the phase current;
   a demodulator to demodulate the phase current having the fundamental component substantially eliminated to produce a first current signal; and
   a circuit for injecting the first current signal to a PWM control input of an inverter drive of the inverter fed motor drive system to affect the inverter output voltage by driving a first harmonic current of the motor substantially to zero thereby to achieve harmonic current control.

10. The apparatus of claim 9, wherein the sensor measures at least two phase currents of the motor;
    the stage substantially eliminating the fundamental component f the phase current comprises a stage substantially eliminating the fundamental component in each of the measured phase currents of the motor;
    the demodulator comprises a demodulator for each of the phase currents having the fundamental component substantially eliminated for producing a first set of current signals; and
    the circuit of injecting comprises a circuit for providing each of the first set of current signals to the PWM control input to drive the first harmonic current of the more substantially to zero.

11. The apparatus of claim 10, further comprising a second demodulator receiving the phase currents having the fundamental component substantially eliminated for producing a second set of current signals;
    a summing stage summing respective ones of the first and second sets of signals to form a third set of signals; and
    the circuit for injecting providing the third set of signals to the PWM control input to drive the first harmonic current and a second harmonic current of the motor substantially to zero.

12. The apparatus of claim 11, further wherein the circuit for injecting sums respective ones of the third set of signals with control inputs to the PWM control input provided from the inverter fed motor drive system.

13. The apparatus of claim 12, wherein the fir and second harmonic currents comprise the $(n-1)^{th}$ harmonic current and the $(n+1)^{th}$ harmonic current resulting in substantially elimination of the $n^{th}$ harmonic torque inverter fed motor drive system, wherein n denotes the $n^{th}$ harmonic, $(n-1)^{th}$ denotes the harmonic current one below the $n^{th}$ and $(n+1)^{th}$ denotes the harmonic current one above the $nt^{th}$.

14. The apparatus of claim 11, wherein the demodulators for each of the phase currents having the fundamental component substantially eliminated that produce respective first and second sets of current signals further each comprise a vector demodulator producing vector demodulated signals, an integrator receiving said vector demodulated signals to generate integrated signals wherein the first and second desired harmonic currents of the motor are regulated to substantially zero and a vector rotator receiving the integrated signals.

15. The apparatus of claim 10, wherein the apparatus is implemented in firmware.

16. The apparatus of claim 15, wherein the firmware comprises a DSP (Digital Signal Processor) or FPGA (Field Programmable Gate Array).

17. The apparatus of claim 9, further comprising an output from said inverter drive providing at least one estimated motor voltage.

18. The apparatus of claim 12, further comprising an output of said motor drive derived from said control inputs to the PWM control input for providing at least one estimated motor voltage.

19. A method for regulating a harmonic current component of an inverter fed motor drive system comprising:

measuring at least two phase currents of the motor;

demodulating each of the phase currents to produce a first set of current signals;

demodulating each of the phase currents to produce a second set of current signals;

summing respective ones of the first and second sets of signals to form a third set of signals; and providing the third set of signals to a PWM control input of an inverter drive of the inverter fed motor drive system to affect the inverter output voltage driving first and second harmonic currents of the motor substantially to zero to achieve harmonic current control.

20. The method of claim 19, further comprising substantially eliminating the fundamental component in each of the measured phase currents of the motor prior to the steps of demodulating.

21. The method of claim 19, further comprising providing an estimated motor voltage from the inverter drive.

22. Apparatus for regulating a harmonic current component of an inverter fed motor drive system comprising:

a sensor measuring at least two phase currents of the motor;

a first demodulator for each of the phase currents for producing a first set of current signals; and a second demodulator receiving each of the phase currents for producing a second set of current signals;

a summing stage summing respective ones of the first and second sets of signals to form a third set of signals; and a circuit for providing the third set of signals to a PWM control input of an inverter drive of the inverter fed motor drive system to affect the inverter output voltage by driving first and second harmonic currents of the motor substantially to zero to achieve harmonic current control.

23. The apparatus of claim 22, further comprising a stage substantially eliminating the fundamental component in each of the measured phase currents of the motor prior to demodulating the phase currents.

24. The apparatus of claim 22, further comprising an output from said inverter drive providing at least one estimated motor voltage.

* * * * *